March 22, 1932.   F. W. RUGGLES   1,850,568
AUTOMOTIVE VEHICLE ATTACHMENT
Filed May 7, 1928   2 Sheets-Sheet 1

INVENTOR
Frank W. Ruggles.
BY Frank C. Harman
ATTORNEY

March 22, 1932. F. W. RUGGLES 1,850,568
AUTOMOTIVE VEHICLE ATTACHMENT
Filed May 7, 1928     2 Sheets-Sheet 2
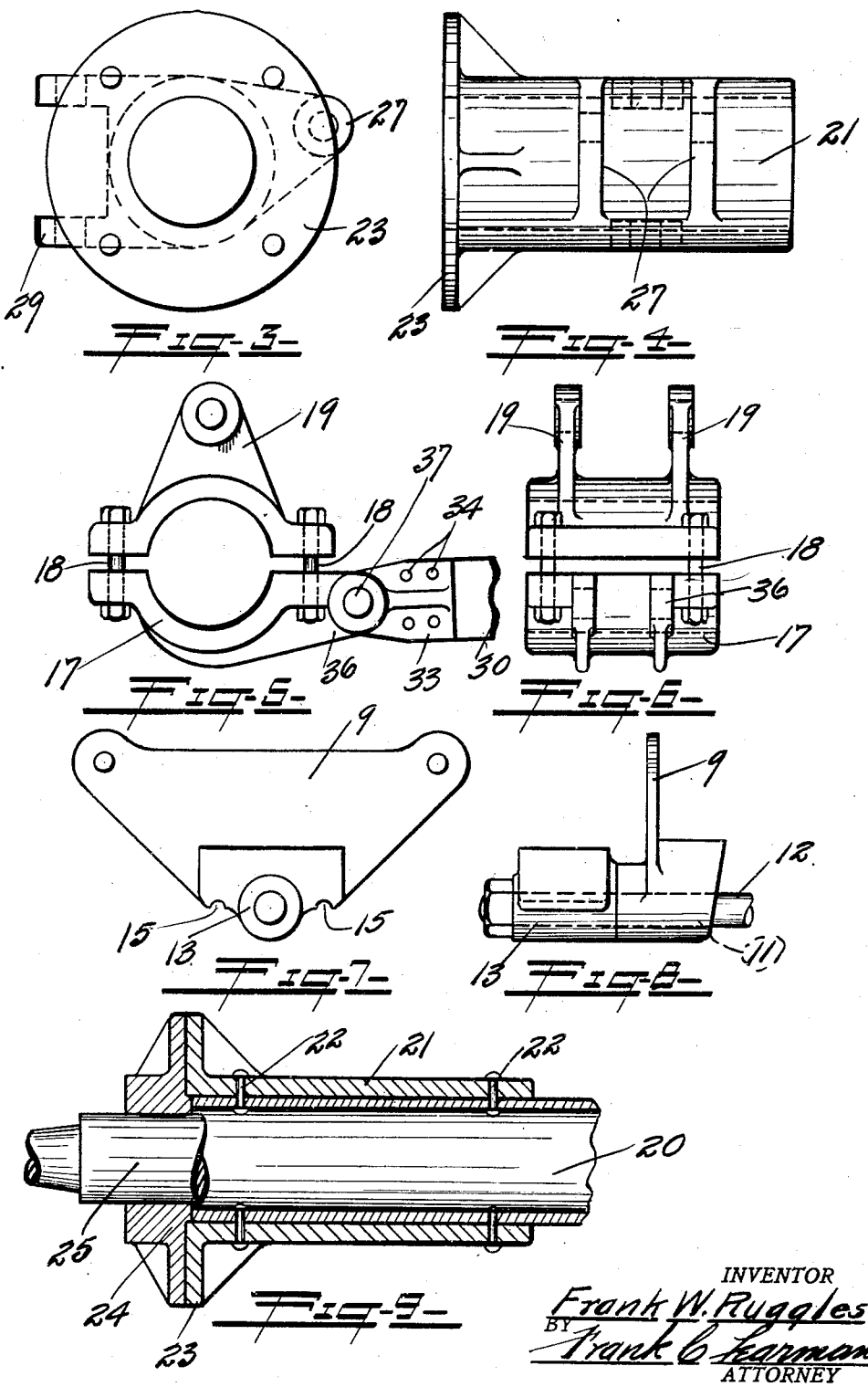

Patented Mar. 22, 1932

1,850,568

UNITED STATES PATENT OFFICE

FRANK W. RUGGLES, OF ALMA, MICHIGAN

AUTOMOTIVE VEHICLE ATTACHMENT

Application filed May 7, 1928. Serial No. 275,846.

This invention relates to truck attachments, and particularly to an attachment comprising a wheeled frame attached in tandem with the driving axle, which lengthens the wheel base and increases the capacity of the vehicle to which it is attached.

One object of the invention is to provide an attachment which in no manner changes the operation or driving of the wheel, and which provides increased loading space, permitting heavier loads without overloading the axle or tires.

Another object is to design a very simple, economical, and substantial attachment which can be easily assembled, and which can be attached with a minimum of time and labor.

A further object is to design an attachment, particularly adaptable for small automotive trucks of limited capacity, so that they can be utilized for hauling loads of capacity equal to a truck of much larger rated capacity.

A still further object is to design an attachment which will have a universal action, and so connected that it is free to follow any motion of the truck without tire slippage.

The above and other objects will appear as the specification progresses, references being had to the accompanying drawings in which I have shown the preferred embodiment of my invention, and in which like reference numerals indicate like parts throughout the several views thereof.

In the drawings:

Fig. 3 is an end view of the rear axle bracket.

Fig. 4 is a back view thereof.

Fig. 5 is an end view of the drive axle bracket.

Fig. 6 is a back view thereof.

Fig. 7 is a side view of the spring pad and bracket.

Fig. 8 is an edge view thereof.

Fig. 9 is a fragmentary sectional detail showing one end of the rear axis.

Figure 1:
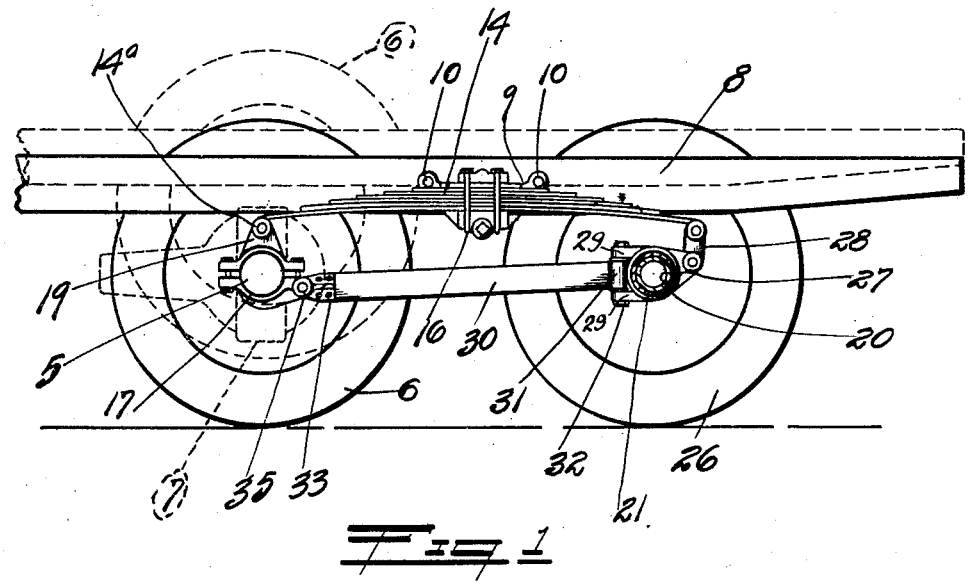
Fig. 1 is a part sectional side view of my attachment, the dotted lines showing the position of the driving axle when one of the driving wheels is passing over an obstacle in the roadway.
Figure 2:
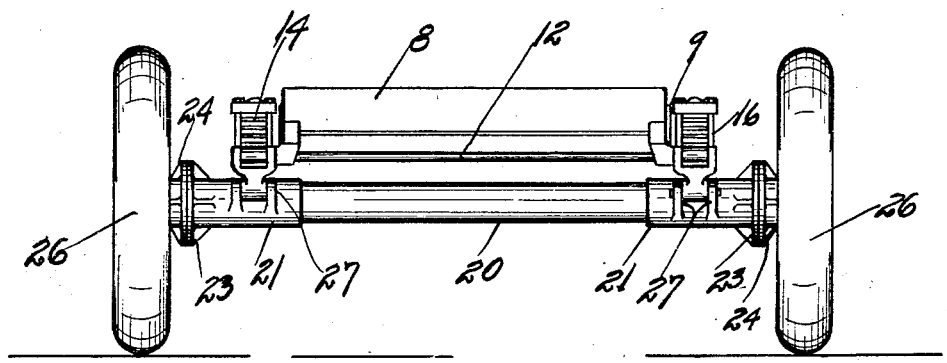
Fig. 2 is a rear end view.

Referring now to the drawings in which I have shown the preferred embodiment of my invention, the numeral 5 indicates the conventional driving axle of an automotive truck on which the wheels 6 are mounted in the usual manner the differential 7 being indicated in dotted lines.

The attachment is connected in tandem and comprises a frame extension 8, having spring brackets 9, (shown in Figs. 7 and 8) secured to opposite sides thereof by means of bolts 10, said brackets being formed with bearings 11 in which a transversely disposed shaft 12 is mounted. Spring pads 13 are pivotally mounted on said shaft directly adjacent the brackets 9 the upper face being flat, and a leaf spring 14 is adapted to be mounted thereon, the bottom of the pad being provided with seats 15 adapted to accommodate U-bolts 16, for clamping the spring in position in the conventional manner.

A split bracket 17 is rigidly clamped to the vehicle drive axle by means of bolts 18, and is formed with spaced apart vertically disposed lugs 19, to which one end of the spring 14 is pivotally connected by means of pins 14$^a$.

The rear axle 20 comprises a part of the attachment, the ends being provided with an axle bracket 21 secured to the axle by means of rivets 22 or the like, the end of said bracket having a flange 23. A similar flange 24 is bolted to the flange 23 by means of bolts (not shown), and a stub shaft 25 is secured thereto, and the wheels 26 are mounted thereon in the conventional manner. Spaced apart ears 27 project from said brackets, and spring shackles 28 are pivotally connected thereto and permit the deflection and lengthening of the spring in the usual manner.

Spaced apart vertically disposed lugs 29 are cast integral with the rear axle bracket, and one end of a torsion bar 30 is adapted to be pivotally connected thereto, the end of said bar being formed with a vertically disposed bearing 31 and a bolt 32 pivotally connects the bar to said lugs.

A forging 33 is connected to the opposite end of the torsion bar by means of rivets 34, the end of said forging having a horizontally disposed bearing 35 adapted to be interposed between the rearwardly disposed spaced apart ears 36, which are cast integral with the drive axle bracket, a bolt 37 serving to pivotally connect the bearing 35 to said ears.

I wish to direct particular attention to the fact that the operation of the truck is in no manner changed, the same springs are used, the pivotal mounting thereof permitting a wide range of vertical movement of the drive axle or rear axle, such as is necessary in riding over obstances, or in deep rutted roadways, the torsion bars permit a universal action, and work in harmony therewith.

From the foregoing description it will be obvious that I have perfected a very simple, economical, and substantial attachment for automotive trucks.

What I claim is:—

The combination with an automotive vehicle including a driving axle, of a frame extension adapted to be riveted to and form an extension of the vehicle frame, a dead axle, spaced apart brackets secured to the respective axle members, a transversely disposed shaft mounted on the frame extension, springs pivotally mounted on said shaft the front ends being pivotally connected to the brackets on the driving axle, shackle connections between the rear ends of the springs and the dead axle, a horizontally mounted torsion bar, the rear end having a vertically disposed pivotal connection with the rear bracket, the front end having a horizontally disposed pivotal connection with the bracket on the drive axle, said vertical and horizontal connections being the only connections of said bars with said axles.

In testimony whereof I hereunto affix my signature.

FRANK W. RUGGLES.